(12) United States Patent
Mushikami et al.

(10) Patent No.: US 9,278,455 B2
(45) Date of Patent: Mar. 8, 2016

(54) ROBOT JOINT STRUCTURE

(75) Inventors: Kimihito Mushikami, Chiyoda-ku (JP); Haruo Ito, Chiyoda-ku (JP); Keisuke Sadao, Chiyoda-ku (JP); Junji Takehara, Chiyoda-ku (JP); Hisato Uda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 46 days.

(21) Appl. No.: 14/390,845

(22) PCT Filed: Apr. 20, 2012

(86) PCT No.: PCT/JP2012/060775
§ 371 (c)(1),
(2), (4) Date: Oct. 6, 2014

(87) PCT Pub. No.: WO2013/157143
PCT Pub. Date: Oct. 24, 2013

(65) Prior Publication Data
US 2015/0059511 A1   Mar. 5, 2015

(51) Int. Cl.
*B25J 17/02* (2006.01)
*B25J 19/00* (2006.01)

(52) U.S. Cl.
CPC .......... *B25J 17/0258* (2013.01); *B25J 17/0283* (2013.01); *B25J 19/0029* (2013.01); *Y10S 901/29* (2013.01)

(58) Field of Classification Search
CPC .......................... B25J 19/0029; B25J 17/0258
See application file for complete search history.

(56) References Cited

U.S. PATENT DOCUMENTS 4,922,755 A * 5/1990 Oshiro et al. ............... 74/490.03
5,549,016 A   8/1996 Nakako et al.

FOREIGN PATENT DOCUMENTS

| JP | 05-131388 A | 5/1993 |
| JP | 05-318378 A | 12/1993 |
| JP | 06-312394 A | 11/1994 |
| JP | 2004-090152 A | 3/2004 |
| JP | 2005-014098 A | 1/2005 |
| JP | 2009-125846 A | 6/2009 |
| TW | M363374 U1 | 8/2009 |

OTHER PUBLICATIONS

Communication dated Aug. 26, 2014, issued by the Taiwan Patent Office in corresponding Taiwanese Application No. 101143205.
International Search Report of PCT/JP2012/060775 dated Jul. 3, 2012.

* cited by examiner

*Primary Examiner* — Terence Boes
(74) *Attorney, Agent, or Firm* — Sughrue Mion, PLLC; Richard C. Turner

(57) ABSTRACT

A wrist includes a wrist housing including a wrist driving structural portion to which rotation is transmitted from a wrist driving pulley, a cylindrical portion arranged coaxially with a rotational axis of the wrist driving structural portion and penetrated by a first hand driving shaft to which rotation is transmitted from a hand driving pulley, a cable introducing portion forming an annular gap with the cylindrical portion, and a hand-driving-shaft penetrating portion penetrated by a second hand driving shaft rotating a hand interface by rotation of the first hand driving shaft being transmitted thereto, and a cable, which comes out of a second arm from a wrist supporting portion, is drawn into the wrist housing from the annular gap and is routed to a hand interface supporting portion in a slackened state.

2 Claims, 9 Drawing Sheets

ROBOT JOINT STRUCTURE

CROSS REFERENCE TO RELATED APPLICATIONS

This is a National Stage of International Application No. PCT/JP2012/060775 filed Apr. 20,2012, the contents of which are incorporated herein by reference in its entirety.

FIELD

The present invention relates to a robot joint structure.

BACKGROUND

There are vertically articulated robots in which the wrist drive mechanism (a 5-axis drive mechanism in the case of a 6-axis multi-joint), which supports the wrist (a 5-axis portion in the case of a 6-axis multi-joint) from both sides by the wrist supporting portions provided at the end of the arm and vertically rotates the wrist, and the hand drive mechanism (a 6-axis drive mechanism in the case of a 6-axis multi-joint), which inwardly and outwardly rotates the end effector (a 6-axis portion in the case of a 6-axis multi-joint) arranged on the wrist, are coaxially arranged.

When the wrist drive mechanism and the hand-portion drive mechanism are arranged in the wrist supporting portion on the same side, the distance from the center of the arm becomes significantly different between the right and left sides. Therefore, in order to prevent interference when the robot is driven, it is necessary to set the interference prevention area with reference to the wrist supporting portion having a greater distance from the center of the arm. Consequently, the interference prevention area increases.

Patent Literature 1 discloses a robot that incorporates the hand drive mechanism in the wrist without the wrist drive mechanism and the hand drive mechanism being coaxially located. With this structure, the difference in thickness between the right and left wrist supporting portions supporting the wrist can be reduced compared with the case where the wrist drive mechanism and the hand drive mechanism are arranged on the same side.

CITATION LIST

Patent Literature

Patent Literature 1: Japanese Patent Application Laid-open No. H05-318378

SUMMARY

Technical Problem

In the vertically articulated robot, if a string-like member (such as a cable and a tube, hereinafter described as a cable and that also includes a tube, such as an air tube), which extends from the base to the hand interface to which an end effector is attached, is exposed to the outside, operations are obstructed in some cases; therefore, it is often required to have a structure in which a cable extends through the inside of the arm and the wrist.

The thickness of the cable that extends from the base to the wrist is substantially fixed regardless of the size of the robot. Therefore, it becomes more difficult to have the space required for routing the cable in the wrist as the robot becomes smaller.

With the structure disclosed in Patent Literature 1, the motor for driving the hand is arranged in the wrist; therefore, the space in the wrist becomes small. Therefore, it is necessary to bend the cable with a small radius of curvature in the wrist. In such a case, the cable is easily broken and thus the durability of the robot decreases. Consequently, it is difficult to use the structure disclosed in Patent Literature 1 for small robots.

The present invention has been achieved in view of the above and an object of the present invention is to obtain a robot joint structure in which the interference prevention area around the arm is small and the cable that extends from the arm to the structure of the wrist is not easily broken.

Solution to Problem

In order to solve the above problems and achieve the object, the present invention is a robot joint structure that includes an arm, in which a pair of wrist supporting portions is formed at an end side, and a wrist, in which a hand interface is arranged at an end side and which is sandwiched and pivotally supported by the pair of wrist supporting portions, and in which a string-like member for being connected to an end effector, sensor, or the like arranged on the hand interface is arranged to extend through an inside of the wrist, wherein the arm includes a wrist driving motor and a hand driving motor that are arranged on a base side with respect to the wrist supporting portions, a wrist driving pulley that is arranged in one of the pair of wrist supporting portions and to which rotation of the wrist driving motor is transmitted, and a hand driving pulley that is arranged in another of the pair of wrist supporting portions such that it is coaxial with the wrist driving pulley and to which rotation of the hand driving motor is transmitted, and the wrist includes a wrist housing that includes a wrist driving structural portion to which rotation is transmitted from the wrist driving pulley, a cylindrical portion that is arranged coaxially with a rotational axis of the wrist driving structural portion and is penetrated by a first hand driving shaft to which rotation is transmitted from the hand driving pulley, a cable introducing portion that forms an annular gap with the cylindrical portion, and a hand-driving-shaft penetrating portion that is penetrated by a second hand driving shaft that is orthogonal to the first hand driving shaft and rotates the hand interface by rotation of the first hand driving shaft being transmitted thereto, and the string-like member, which comes out of the arm from the another of the pair of wrist supporting portions, is drawn into the wrist housing from the annular gap, is laid in a slackened state in the wrist housing, and is routed to an inside of the hand interface supporting portion.

Advantageous Effects of Invention

The robot joint structure according to the present invention has an effect where the interference prevention area around the arm is small and the durability of the robot can be improved.

DESCRIPTION OF EMBODIMENTS

Exemplary embodiments of a robot joint structure according to the present invention will be explained below in detail with reference to the drawings. This invention is not limited to the embodiments.

Embodiment

Figure 1:
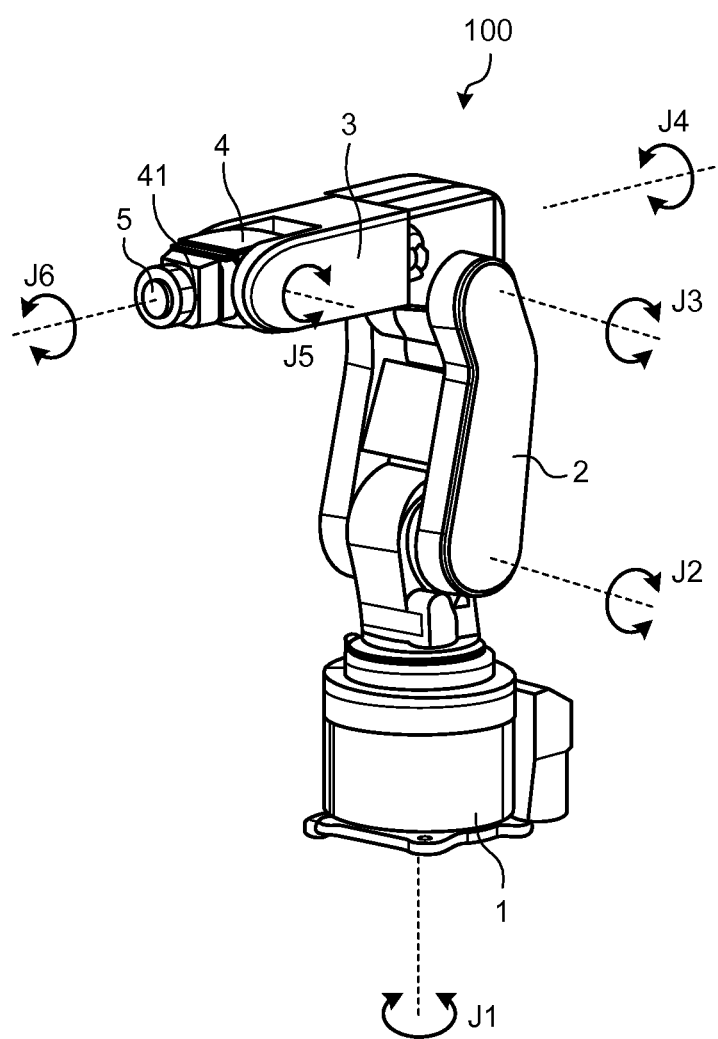
FIG. 1 is a diagram illustrating an embodiment of a vertically articulated robot to which a robot joint structure according to the present invention is applied.

FIG. 1 is a diagram illustrating an embodiment of a vertically articulated robot to which a robot joint structure according to the present invention is applied. A vertically articulated robot 100 according to the embodiment is a 6-axis vertically articulated robot and includes a base 1, a first arm 2, a second arm 3, and a wrist 4. A first axis (J1) about which the first arm 2 rotates in the horizontal direction and a second axis (J2) about which the first arm 2 rotates in the vertical direction are provided between the base 1 and the first arm 2. A third axis (J3) about which the second arm 3 rotates in the vertical direction is provided between the first arm 2 and the second arm 3. The second arm 3 includes a fourth axis (J4) about which the end side of the second arm 3 rotates such that it is turned with the longitudinal direction as the axial direction. The end side of the second arm 3 is divided into two portions. The second arm 3 supports the wrist 4 from both sides such that the wrist4 is rotatable around a fifth axis (J5). The wrist 4 includes a hand interface (Interface: I/F) 5 to which an end effector (such as a hand) is attached. The end effector attached to the hand I/F 5 is rotatable such that it is turned with a sixth axis (J6), which is orthogonal to the fifth axis (J5), as a rotational axis.

Figure 2:
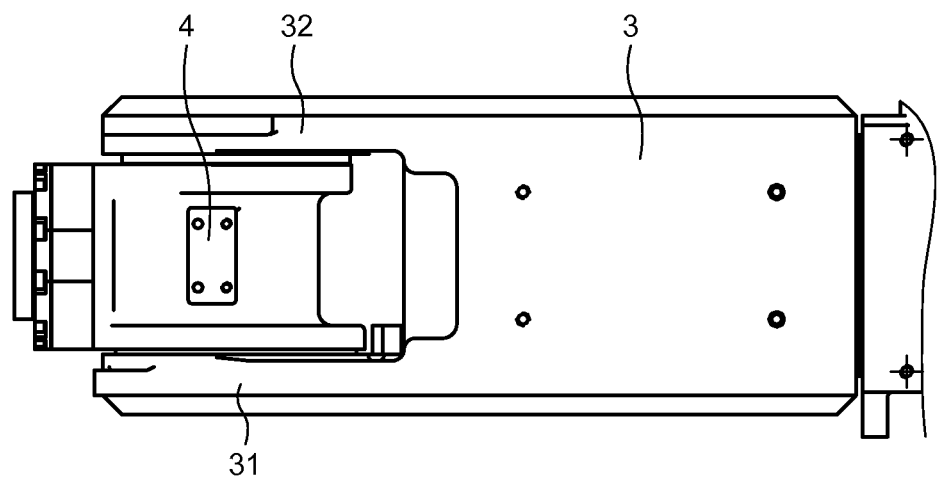
FIG. 2 is a top expanded view of a portion of a second arm and a wrist.

FIG. 2 is a top expanded view of a portion of the second arm and the wrist. The end side of the second arm 3 forms wrist supporting portions 31 and 32 and pivotally supports the wrist 4 by sandwiching the wrist 4 between the wrist supporting portions 31 and 32.

Figure 3:
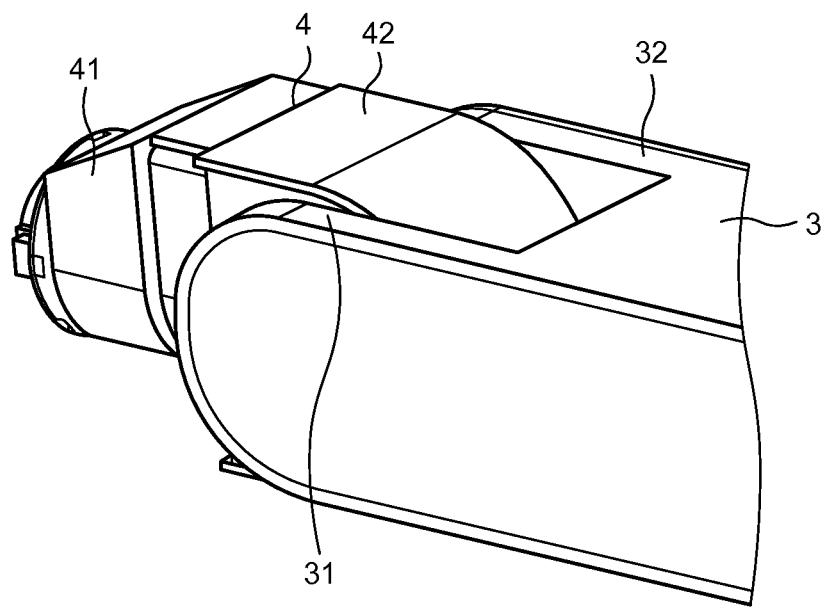
FIG. 3 is a perspective view of a portion of the second arm and the wrist.
Figure 4:
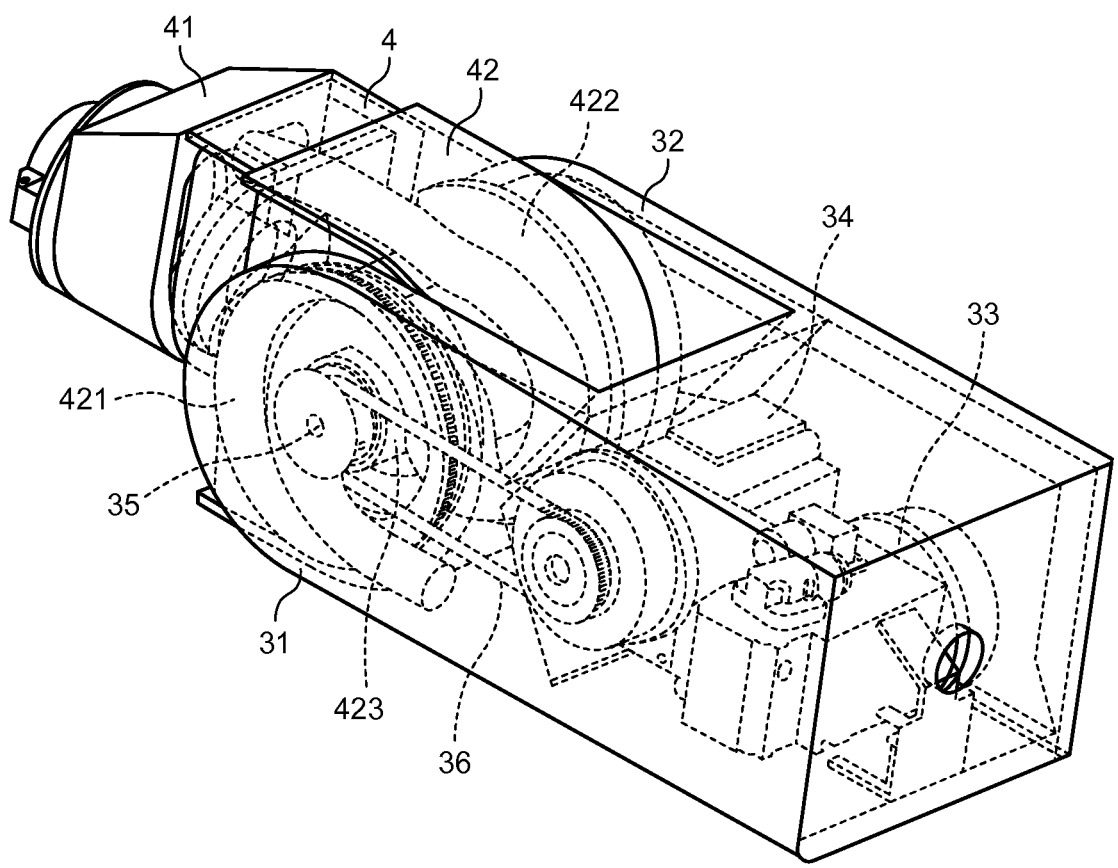
FIG. 4 is a perspective view of a portion of the second arm and the wrist.
Figure 5:
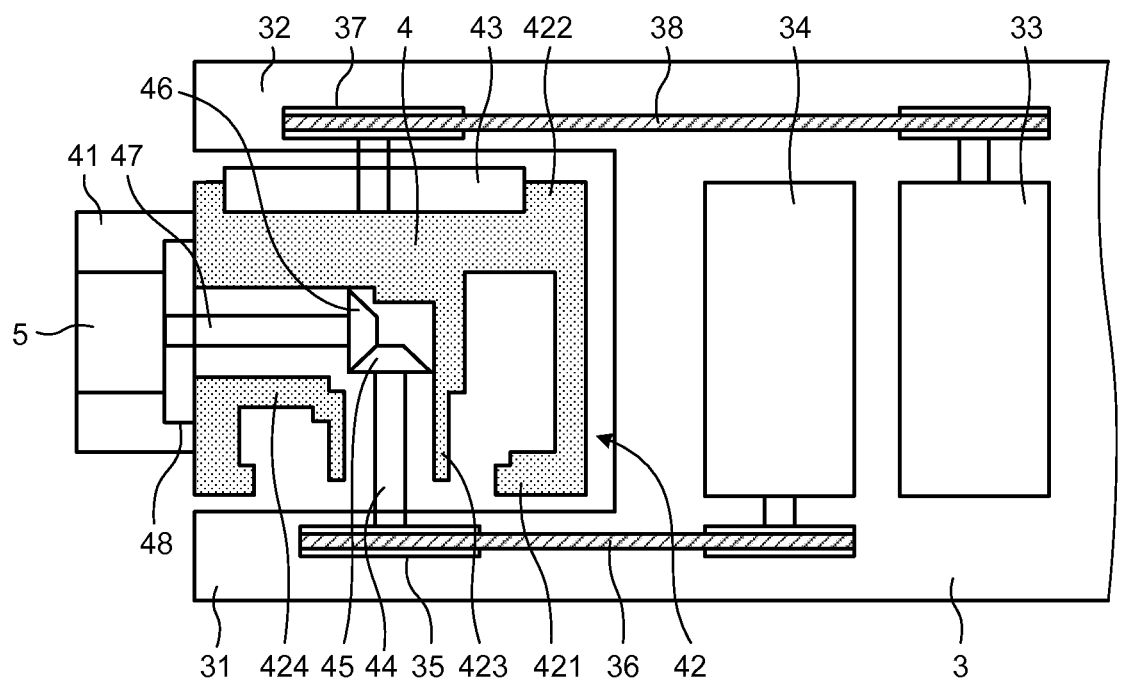
FIG. 5 is a cross-sectional view of the second arm and the wrist.

FIG. 3 and FIG. 4 are perspective views of a portion of the second arm and the wrist. FIG. 4 illustrates the inside of the second arm 3 and the wrist 4 in a cutaway manner. FIG. 5 is a cross-sectional view of the second arm and the wrist. In FIG. 5, a cable 39, which extends from the base 1 to a hand I/F supporting portion 41, and parts, such as a bearing, that are not directly involved in power transmission are not illustrated and the structure of the joint portion is schematically illustrated. A wrist driving motor 33 and a hand driving motor 34 are arranged in a portion of the second arm 3 on the base side (the first arm 2 side) with respect to the wrist supporting portions 31 and 32. A hand driving pulley 35 is arranged in the wrist supporting portion 31 and a hand driving belt 36 is arranged between the hand driving motor 34 and the hand driving pulley 35. A wrist driving pulley 37 is arranged in the wrist supporting portion 32 and a wrist driving belt 38 is arranged between the wrist driving motor 33 and the wrist driving pulley 37.

Figure 6:
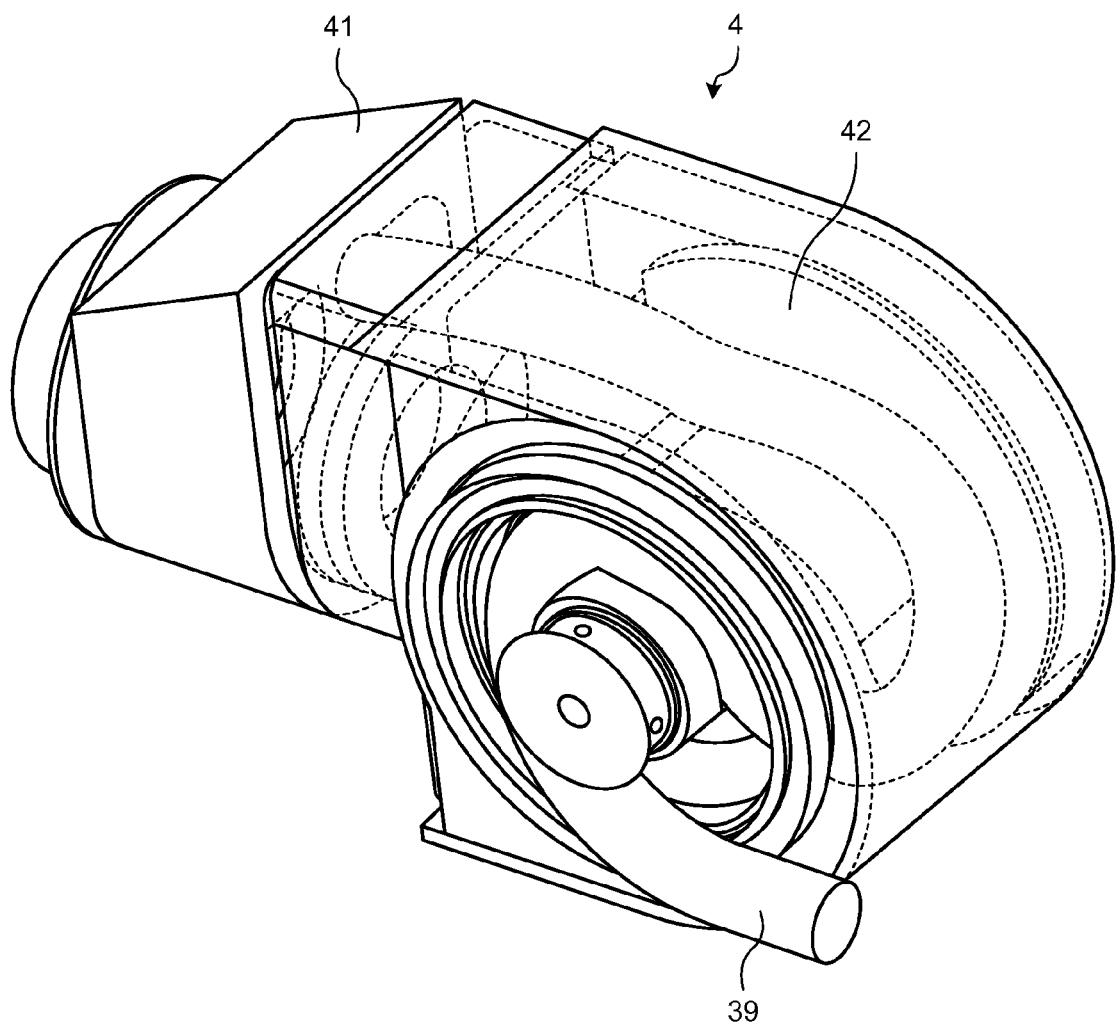
FIG. 6 is a diagram illustrating the configuration of the wrist.
Figure 7:
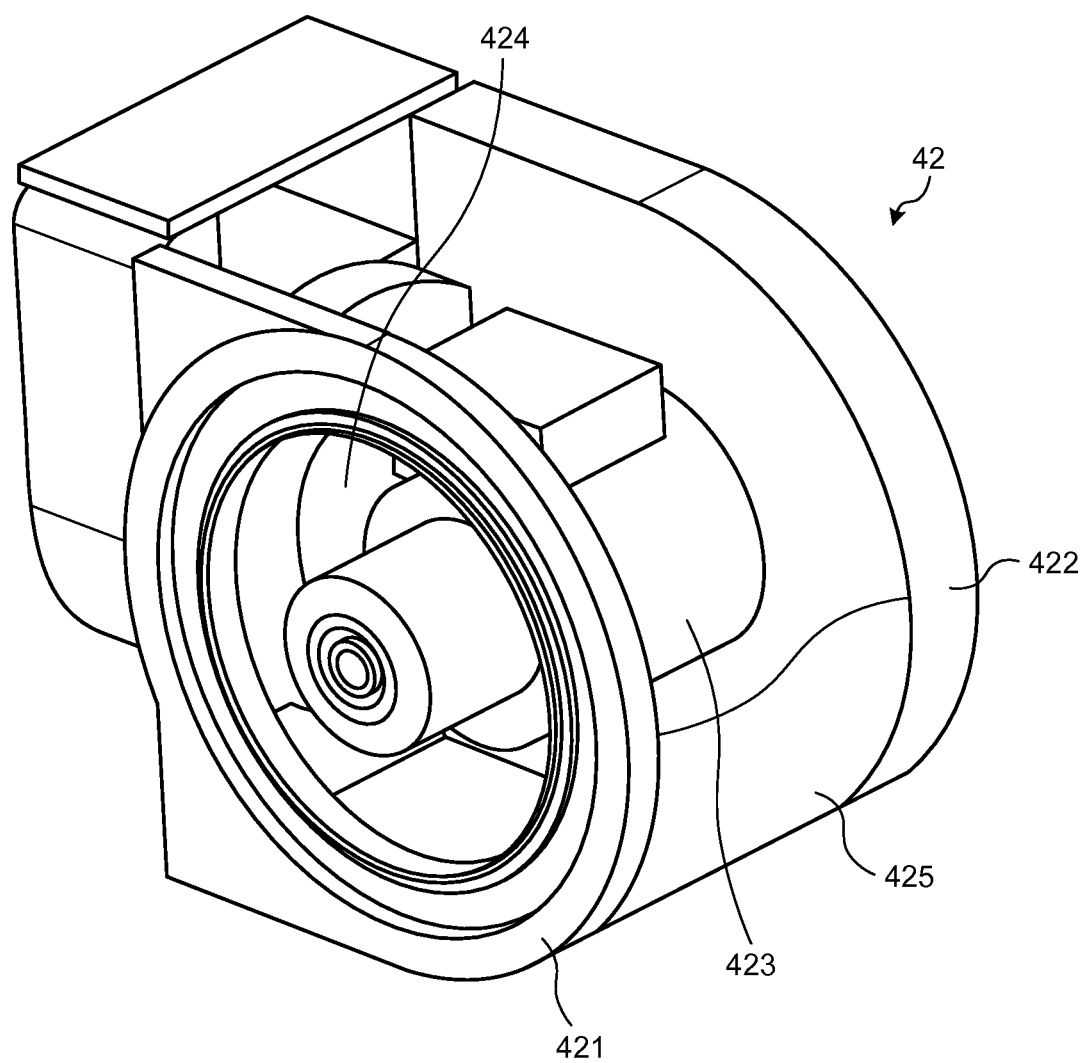
FIG. 7 is a diagram illustrating the configuration of a wrist housing.
Figure 8:
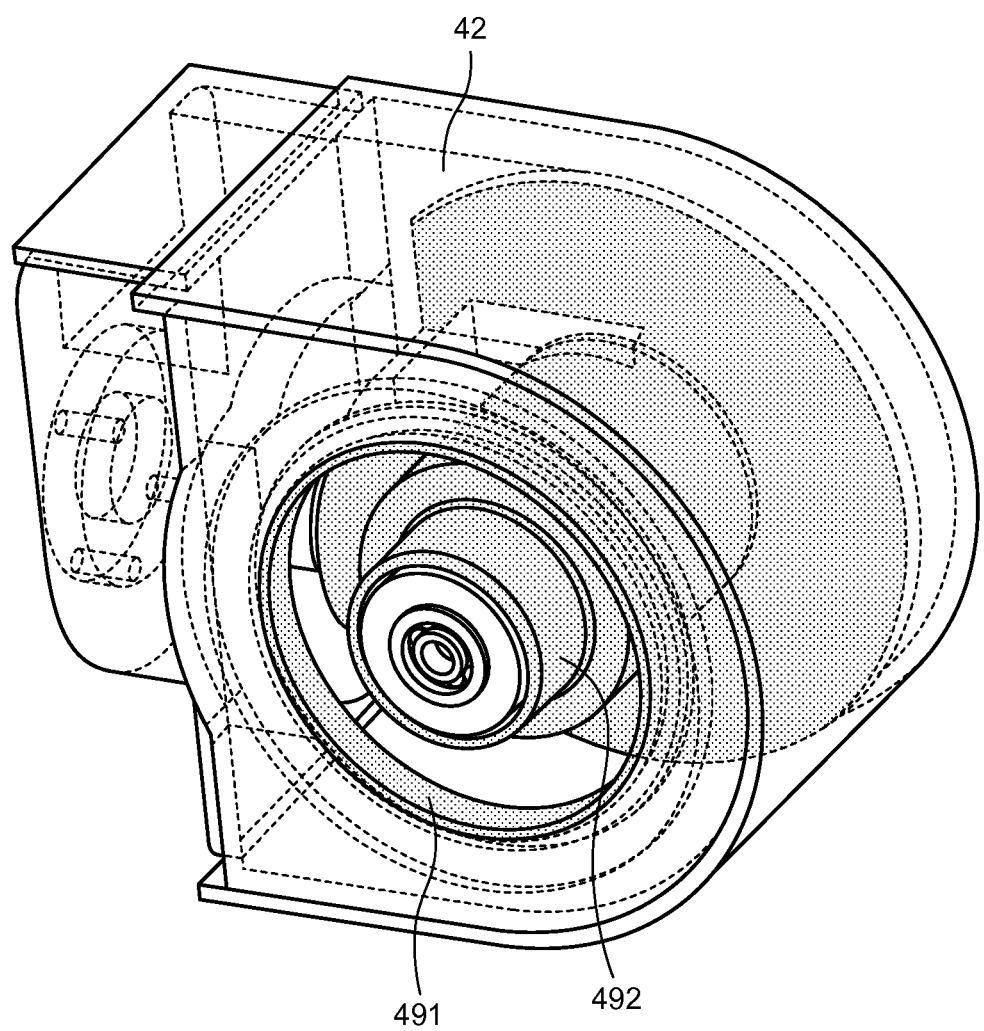
FIG. 8 is a diagram illustrating the wrist housing to which cable guides are attached.

FIG. 6 is a diagram illustrating the configuration of the wrist and illustrates the inside of the wrist in a cutaway manner. The wrist 4 includes a wrist housing 42 arranged in a portion through which the fifth axis (J5) extends and a hand I/F supporting portion 41 arranged on the end side of the wrist housing 42. FIG. 7 is a diagram illustrating the configuration of the wrist housing. The wrist housing 42 includes a cable introducing portion 421, a wrist driving structural portion 422, a cylindrical portion 423, and a hand-driving-shaft penetrating portion 424. The cylindrical portion 423 and the hand-driving-shaft penetrating portion 424 are covered with a cover portion 425 that is provided between the cable introducing portion 421 and the wrist driving structural portion 422 and forms an outer surface. However, in FIG. 7, part of the cover portion 425 is not illustrated in order to allow the illustration of the inner structure. The wrist housing 42 is integrally formed from a metal material. Cable guides 491 and 492 are attached inside the wrist housing 42 such that it covers the cable introducing portion 421, the wrist driving structural portion 422, the cylindrical portion 423, the hand-driving-shaft penetrating portion 424, and the like. FIG. 8 is a diagram illustrating the wrist housing to which cable guides are attached. The cable guides 491 and 492 are formed of a resin having low friction with the cable 39.

As illustrated in FIG. 5, the wrist driving structural portion 422 is connected to the wrist driving pulley 37 via a speed reducer 43. The rotation of the wrist driving motor 33 is transmitted to the wrist driving structural portion 422 via the wrist driving belt 38, the wrist driving pulley 37, and the speed reducer 43, and the wrist 4 rotates around the fifth axis (J5) as a rotational axis.

A first hand driving shaft 44 connected to the hand driving pulley 35 is inserted in the cylindrical portion 423. A bevel gear 45 is attached to the first hand driving shaft 44 that extends from the hand driving pulley 35. The bevel gear 45 meshes with a bevel gear 46 that is attached to a second hand driving shaft 47 that penetrates the hand-driving-shaft penetrating portion 424 and reaches the end of the wrist housing 42. Due to the meshing of the bevel gears 45 and 46, the rotational direction is changed by 90 degrees in the wrist housing 42. The hand I/F 5 is connected to the end of the second hand driving shaft 47 via a speed reducer 48. Therefore, the rotation of the hand driving motor 34 is transmitted to the hand I/F 5 via the hand driving belt 36, the hand driving pulley 35, the first hand driving shaft 44, the bevel gear 45, the bevel gear 46, the second hand driving shaft 47, and the speed reducer 48, and the hand I/F 5 thus rotates around the sixth axis (J6) as a rotational axis.

When the wrist 4 rotates, the hand driving motor 34 controls the hand driving pulley 35 to rotate such that the first hand driving shaft 44 rotates in accordance with the rotation of the speed reducer 43 (what is called, co-rotation). Accordingly, the wrist 4 can be rotated without rotating the hand.

Figure 9:
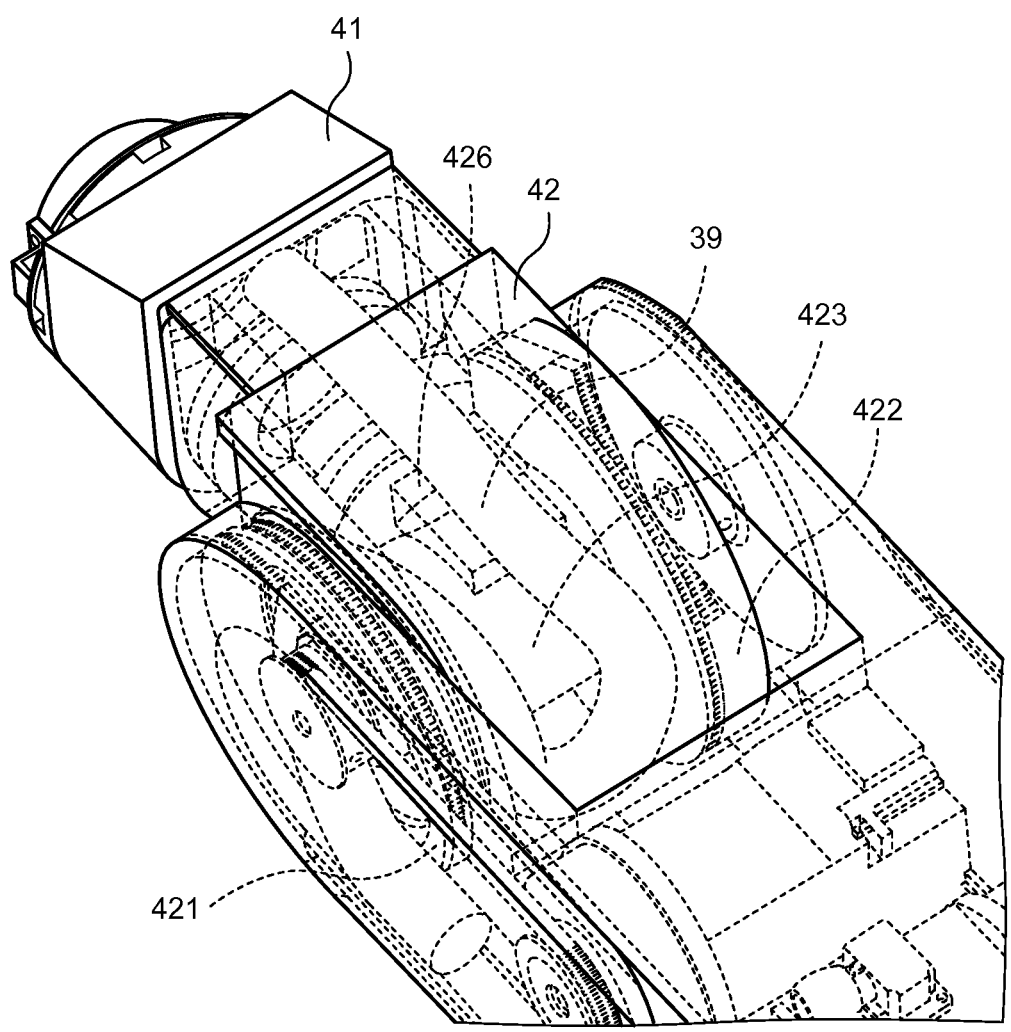
FIG. 9 is a diagram illustrating the state of a cable in the wrist housing.

FIG. 9 is a diagram illustrating the state of the cable in the wrist housing. FIG. 9 illustrates the inside of the second arm 3 and the wrist 4 in a cutaway manner. In the wrist supporting portion 31, the cable 39, which extends from the base 1 to the hand I/F supporting portion 41, is routed. The cable 39 that comes out of the second arm 3 from the wrist supporting portion 31 is drawn into the wrist housing 42 from the annular gap between the cylindrical portion 423 and the cable introducing portion 421, is bent through 180 degrees to form a U shape on the cylindrical portion 423,comes out of the wrist housing 42 after being clamped on a clamp base 426 provided on the cylindrical portion 423, and reaches the hand I/F supporting portion 41. In other words, the cable 39 is laid in a slackened state in the wrist housing 42 and is routed to the hand I/F supporting portion 41.

When the wrist 4 rotates, the amount of slack in the cable 39 changes and the cable 39 moves in the wrist housing 42. Therefore, as described above, the cable 39 is prevented from being abraded and damaged in the wrist housing 42 by attaching the cable guide 491 and 492, enabling the durability of the cable 39 to be improved.

In order to prevent the cable 39 from coming into contact with the hand driving belt 36, a cover may be arranged such that the annular gap between the cable introducing portion 421 and the cylindrical portion 423 is covered near the portion where the hand driving belt 36 is arranged.

With the above configuration, because the inner space of the wrist housing 42 excluding the space with the width of the speed reducer 43 can be used for routing the cable 39, it is not necessary to bend the cable 39 with a small radius of curvature in the wrist housing 42. Accordingly, the durability of the cable 39 is improved and thus the product life of the robot 100 can be prolonged. Moreover, because it is possible to secure sufficient space for routing the cable 39 in the wrist housing 42, it is not necessary to use a special cable for the cable 39. Furthermore, because the wrist driving pulley 37, which is a wrist drive mechanism, and the hand driving pulley 35, which is a hand drive mechanism, are separately arranged on the right and left sides, respectively, the right and left wrist supporting portions 31 and 32 can have approximately the same thickness. Accordingly, the interference prevention area around the arm is reduced and thus the space required for installing the robot 100 can be reduced. Moreover, because the width of the second arm 3 can be reduced, the robot 100 can be operated in a small space.

With the above structure, the wrist 4 is supported from both sides by the wrist supporting portions 31 and 32; therefore, the mechanical strength of the joint portion can be increased.

In the above explanation, an example is given of a structure in which the cable comes out of the wrist housing to the end side after being bent through 180 degrees to form a U shape on the cylindrical portion in the wrist housing; however, the structure may be such that the cable comes out of the wrist housing to the end side after being bent through 180 degrees to form a U shape on the lower side of the cylindrical portion. Alternatively, the structure may be such that the cable drawn into the wrist housing from the gap between the ring portion and the cylindrical portion is wound around the cylindrical portion and then comes out to the end side of the wrist housing.

In the above embodiment, a 6-axis vertically articulated robot is explained as an example; however, the present invention can be applied to any vertically articulated robot without being limited to a 6-axis type as long as the vertically articulated robot includes a wrist and a hand.

INDUSTRIAL APPLICABILITY

As described above, the robot joint structure according to the present invention is useful because the space required for installation is small and the durability of the cable is high, and is particularly suitable for application to a small vertically articulated robot in which the installation space for cable is relatively small.

REFERENCE SIGNS LIST 1 base
2 first arm
3 second arm
4 wrist
5 hand interface
31, 32 wrist supporting portion
33 wrist driving motor
34 hand driving motor
35 hand driving pulley
36 hand driving belt
37 wrist driving pulley
38 wrist driving belt
39 cable
41 hand I/F supporting portion
42 wrist housing
43, 48 speed reducer
44 first hand driving shaft
45, 46 bevel gear
47 second hand driving shaft
100 vertically articulated robot
421 cable introducing portion
422 wrist driving structural portion
423 cylindrical portion
424 hand-driving-shaft penetrating portion
425 cover portion
426 clamp base
491, 492 cable guide

The invention claimed is:

1. A robot joint structure that includes an arm, in which a pair of wrist supporting portions is formed at first end side, and a wrist, in which a hand interface, supported by a hand interface supporting portion, is arranged at an second end side and which is sandwiched and pivotally supported by the pair of wrist supporting portions, and in which a cable member connected to the hand interface is arranged to extend through an inside of the wrist, wherein the arm includes
a wrist driving motor and a hand driving motor that are arranged on a base side with respect to the wrist supporting portions,
a wrist driving pulley that is arranged in one of the pair of wrist supporting portions and to which rotation of the wrist driving motor is transmitted, and
a hand driving pulley that is arranged in another of the pair of wrist supporting portions such that it is coaxial with the wrist driving pulley and to which rotation of the hand driving motor is transmitted, and the wrist includes a wrist housing that includes a wrist driving structural portion to which rotation is transmitted from the wrist driving pulley, a cylindrical portion that is arranged coaxially with a rotational axis of the wrist driving structural portion and is penetrated by a first hand driving shaft to which rotation is transmitted from the hand driving pulley, a cable introducing portion that forms an annular gap with the cylindrical portion, and a hand-driving-shaft penetrating portion that is penetrated by a second hand driving shaft that is orthogonal to the first hand driving shaft and rotates the hand interface by rotation of the first hand driving shaft being transmitted thereto, and the cable member, which comes out of the arm from the another of the pair of wrist supporting portions at the first end side, is drawn into the wrist housing from the annular gap and is routed to the hand interface supporting portion at the second end side in a slackened state in the wrist housing, wherein the cable is routed to an inside of the hand interface supporting portion through an inner face of the hand interface supporting portion which faces the inside of the wrist housing, wherein the cable member, which is drawn into the wrist housing from the annular gap, is routed to the hand interface supporting portion after being bent into a U shape around the cylindrical portion.

2. The robot joint structure according to claim 1, further comprising a cable guide, which is formed of a material whose friction with the cable member is smaller than a material forming the wrist housing, and which covers the cable introducing portion, the wrist driving structural portion, the cylindrical portion, and the hand-driving-shaft penetrating portion by being attached to the wrist housing.

* * * * *